Sept. 30, 1969     D. L. BRANTON     3,469,596

LIQUID TRANSFER APPARATUS

Filed Oct. 2, 1967

Inventor
Donald L. Branton

By Andrus & Starke
Attorneys

United States Patent Office 3,469,596
Patented Sept. 30, 1969

3,469,596
LIQUID TRANSFER APPARATUS
Donald L. Branton, Delavan, Wis., assignor to Sta-Rite Industries, Inc., Delavan, Wis., a corporation of Wisconsin
Filed Oct. 2, 1967, Ser. No. 672,254
Int. Cl. B67c 3/16; A01j 5/00, 3/00
U.S. Cl. 137—205                                    7 Claims

ABSTRACT OF THE DISCLOSURE

The invention relates to a milk transfer apparatus which receives milk from a pipeline and periodically transfers the milk to a bulk storage tank. The apparatus includes a jar having an inlet connected to the pipeline and an outlet connected to the suction side of a pump. In addition, a vacuum line is connected to the jar and the vacuum acts through the pipeline to draw the milk from the individual milkers and convey the milk to the jar.

Figure 1:
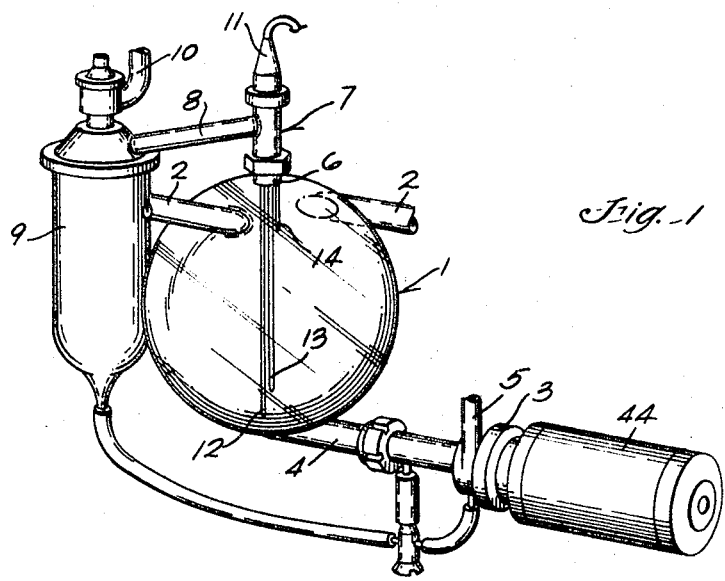

Upper and lower probes are provided in the jar and during the milking cycle, when the milk level increases to the level of the upper probe, the pump is operated to pump milk from the jar and when the level of the milk falls beneath the lower probe, the pump is stopped.

During the washing cycle, after completion of the milking, a time delay element is incorporated in the control circuit and acts to delay energization of the pump motor for a pre-set time after the wash solution has reached the level of the upper probe. This delay permits the wash solution to rise to the upper end of the jar and spill over into the milk trap to sanitize the trap before the pump motor is started.

---

In a pipeline milking system, a pipeline extends around the barn or other milking area and connects the individual milkers to a milk-receiving jar. To draw milk from the individual milkers through the pipeline to the jar, a vacuum line is connected to the upper end of the jar. In the conventional system, the milk is periodically pumped from the jar and delivered to a bulk storage tank, and the pumping is controlled by an upper and lower probe located within the jar. When the level of milk in the jar increases to the level of the upper probe, the pump is operated to discharge milk from the jar to the bulk storage tank, and when the level of milk has receded beneath the level of the lower probe, the pump is stopped.

After the milking operation has been completed, it is necessary to completely sanitize all portions of the pipeline system which were contacted by the milk and to do this, an automatic washing system is used. In one type of conventional washing system, a third probe is located at the upper end or neck of the milk-receiving jar. During the wash cycle, the third probe is connected in the control circuit so that the pump will not be operated until the wash solution rises in the jar to the level of the third probe, thereby permitting a small amount of the washing solution to spill over into the milk trap before the pump is operated to pump the wash solution from the jar.

The present invention is directed to an inproved milk transfer system which eliminates the third probe normally employed in the conventional pipeline washing system. According to the invention, a time delay element is incorporated in the control circuit during the wash cycle. The time delay serves to delay the energization of the pump motor for a predetermined time after the wash solution has reached the level of the upper probe. This delay permits the solution to rise to the upper end or neck of the milk-receiving jar and enables a small amount of the solution to spill into the milk trap before the pump is operated. The wash solution which spills over into the milk trap provides a sanitizing action in the trap area in the event that any milk has splashed over into the trap during the milking operation.

By eliminating the third probe, an additional element is removed from the milk zone which simplifies the cleaning operation.

The use of the time delay also eliminates any possibility of a short circuit being established between a third upper probe and the stainless steel neck of the milk-receiving jar during the washing cycle.

A further advantage of the invention is that the delay period can be readily adjusted by use of a different time delay element, thereby enabling the dairyman to readily adjust the level of wash solution in the jar whereat the pump is started and provide the optimum operating characteristics for each milking system.

Other objects and advantages will appear in the course of the following description.

The drawings illustrate the best mode presently contemplated of carrying out the invention.

Figure 2:
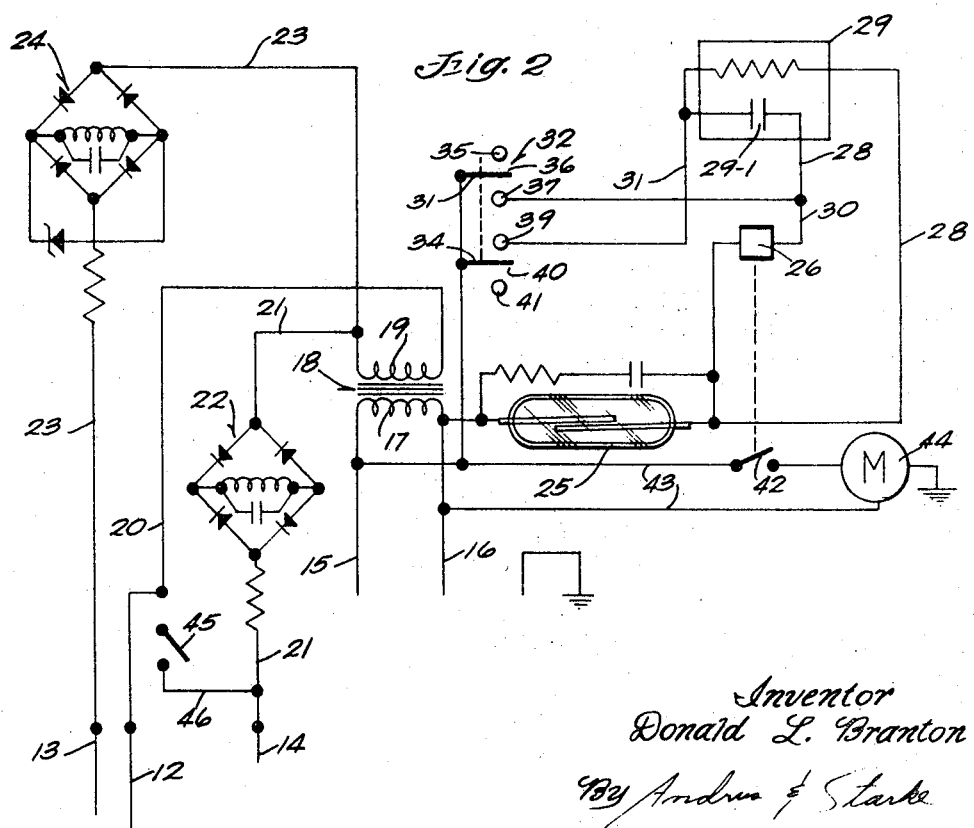

In the drawings:

FIG. 1 is a perspective view of a portion of a pipeline milking system showing the milk-receiving jar, pump and milk trap; and FIG. 2 is a wiring diagram.

The drawings illustrate a portion of a pipeline milking system including a milk-receiving jar 1 having a pair of tangential inlet nipples 2 which are adapted to be connected to the ends of a pipeline, not shown, that extends around the barn or other milking area. Individual milkers are connected at spaced locations along the length of the pipeline and milk from the milkers is conveyed through the pipeline and delivered through inlets 2 to the jar 1. Periodically, the milk is withdrawn from the jar by a pump 3 which is connected to the tangential outlet nipple 4 located in the bottom of jar 1. The milk is discharged from pump 3 through conduit 5 to a bulk storage tank, not shown.

The jar 1 is also provided with a central overflow outlet 6 and a T-fitting 7 is connected to the outlet 6. The stem 8 of T-fitting 7 is connected to the upper end of milk trap 9. In addition, a vacuum line 10 connects the upper end of trap 9 to a source of sub-atmospheric pressure, such as a vacuum pump, and the vacuum acts through the jar 1 and pipeline to draw milk from the individual milkers to the jar. The milk tray 9 is a conventional type, serving as a safety device to close the vacuum line 10 in the event milk floods over into the milk trap from the receiving jar 1 during the milking operation due to excessive air being injected into the milk line or due to failure of the milk pump.

Enclosing the upper arm of the T-fitting 7 is a cap 11 and a series of probes 12, 13 and 14 extend downwardly from the cap 11. Probe 12 serves as a ground and extends downwardly to a position just above the lower end of the jar 1, while the lower probe 13 terminates slightly above the lower extremity of ground probe 12 and upper probe 14 terminates at a level corresponding generally with the level of inlets 2. Probes 12, 13 and 14 are operably connected to the motor of the pump 3. During the milking operation, the circuitry is arranged so that when milk entering the jar 1 through the inlets 2 reaches the level of the upper probe 14, the pump 3 will be actuated to withdraw the milk from the jar through the outlet 4. When the milk level within the jar 1 recedes to a level beneath the lower probe 13, the electrical contact between probes 12 and 13 will be broken to thereby stop operation of the pump. Thus, the probes 12, 13 and 14 function during the milking cycle to automatically start the operation of pump 3 when the level of milk within the jar has increased to a predetermined high level and to shut off the operation of the pump when the level of milk has decreased to a second lower level.

After the milking operation has been completed, it is necessary to completely wash or sanitize all parts of the pipeline system which were contacted with milk. During the milking cycle, milk may splash over through the stem 8 of T-fitting 7 to the milk trap 9, and it is necessary during the washing cycle for some of the washing solution to correspondingly spill over into the trap or the bacteria count will increase in the trap. According to the invention, a time delay element is added to the control circuit during the washing cycle so that the starting of the pump 3 will be delayed for a preset time after the washing solution has risen to the level of the upper probe 14. This delay permits the washing solution to rise into the neck or overflow outlet 6 of jar 1 and permits a small amount of the washing solution to spill over into the milk trap 9 before the pump 3 is started. Once the pump motor is started, the pump operates until the circuit between the probes 12 and 13 is broken, as in the milking cycle.

FIG. 2 illustrates the wiring diagram showing the incorporation of the time delay element into the system.

Power lines 15 and 16 are connected to the winding 17 of transformer 18. One end of the winding 19 of transformer 18 is connected by line 20 to the ground probe 12, while the other end of winding 19 is connected by line 21 through bridge rectifier 22 to the upper probe 14. In addition, line 23 connects line 21 with the lower probe 13, and a bridge rectifier 24 is connected in line 23.

When the milk level within the jar 1 rises to a level to complete the circuit between the ground probe 12 and the lower probe 13, the rectifier 24 will be energized. Rectifier 24 will establish a magnetic flux of sufficient magnitude to hold reed relay 25 in the closed position, but not of sufficient magnitude to close the relay 25. However, when the level of milk within the jar 1 rises to complete the circuit between ground probe 12 and upper probe 14, the rectifier 22 will be energized to establish a magnetic flux effective to close the relay 25.

Relay 25 is connected between power line 16 and relay 26 by line 27, and relay 25 is also connected by line 28 to one terminal of a time delay element 29. The timer 29 is also connected by line 30 to relay 26 and by line 31 through double pole switch 32 to power line 15.

Switch 32 includes a pair of interconnected switch arms 33 and 34 which are manually movable in unison between three contact positions. Switch arm 33 is movable between contacts 35, 36 and 37, with contact 37 being connected by line 38 to line 30, and switch arm 34 is movable between contacts 39, 40 and 41, with contact 39 connected in line 31. Contacts 35 and 39 correspond to the "wash" position, contacts 36 and 40 are the "off" position, and contacts 37 and 41 represent the "milk" position.

Relay 26, when energized, acts to close a normally open switch 42 connected in line 43 between the power lines 15 and 16 in series with the motor 44 of pump 3.

In operation of the system, the milking cycle is started by moving the switch 32 to the "milk" position wherein the switch arm 33 will be engaged with contact 37 and the switch arm 34 will be engaged with contact 41.

As the milk level rises within the jar 1, the circuit will be completed between the ground probe 12 and the lower probe 13, thereby energizing the rectifier 24. However, the magnetic flux developed by rectifier 24 is not sufficient to close the relay 25 so that the pump will not operate at this time.

As the milk level continues to rise in the jar 1, the circuit between the ground probe 12 and the upper probe 14 will be completed to thereby energize the rectifier 22. The magnetic flux generated by rectifier 22 will act to close the reed relay 25 and thereby complete the circuit from power line 16, through relay 25, line 27, relay 26, line 30, line 38, switch arm 33 and line 31 to power line 15. Energizing relay 26 will close switch 42 to start the motor 44 of pump 3 to thereby draw milk from the jar 1.

As the milk level recedes within jar 1, the contact between ground probe 12 and upper probe 14 will be broken to thereby de-energize the rectifier 22. However, rectifier 24 will still be energized and the flux generated by rectifier 24 will be sufficient to maintain the reed relay 25 in the closed position and maintain operation of the pump motor 44 until the milk level falls beneath the level of the lower probe 13, at which time the circuit will be broken and the pump will be stopped.

When it is desired to sanitize the pipeline system, the switch 32 is moved to the "wash" position wherein the switch arm 33 is in engagement with the contact 35, and switch arm 34 is engaged with contact 39. As the level of the wash solution rises in jar 1 to the level of the upper probe 14, the circuit between the ground probe 12 and upper probe 14 will be completed and, as previously described, the reed relay 25 will be closed. Closing of the reed relay 25 will complete the circuit through line 28, timer 29, line 31 and switch arm 34 to energize the timer. Energizing the timer will cause the timer contacts 29–1 to close after a predetermined time period, and closing of timer contacts 29–1 will act to complete the circuit through line 27, relay 26 and line 30 to energize the relay. Energizing the relay 26 acts to close switch 42 and operate the pump motor 44. With the time delay element 29 in the circuit, the pump motor will not be operated immediately when the wash solution rises to the level of the upper probe 14, but will be delayed for a preset time, depending on the particular setting of the timer. Thus, the time delay permits the wash solution to rise up into the neck of the jar 1 with a small portion of the liquid splashing over into the trap 1 to sanitize the trap.

Once the pump begins operation, the system operates in a manner similar to that described in connection with the milking system. When the level of the wash solution falls beneath the level of lower probe 13 in jar 1, the circuit will be opened and the pump will be stopped.

To permit the volume of milk or wash solution in jar 1, beneath the level of probe 13, to be removed from the jar at the completion of the milking and washing operations, a manual switch control is provided for pump motor 44. Switch 45 is connected in line 46 across the lines 20 and 21, and by manually closing switch 45, rectifier 22 will be energized which acts to operate the pump motor 44 through the circuitry previously described.

The milk transfer system of the invention provides a degree of adjustment which is not possible with the probe type of system used in conventional units. The delay period is readily adjustable by substituting various timing elements so that the dairyman can adjust the time delay and therefore the level at which the pump will start operation for the given milking system. As the water flow during the washing cycle depends on several factors, such as the length of the pipeline, the amount of air injected and the capacity of the vacuum pump, the invention enables the dairyman to select the optimum time or level at which the pump will start operation to thereby obtain optimum performance for the washing operation.

In addition, the use of the time delay eliminates the inherent problem of short circuits which can result when utilizing an upper third probe for the washing cycle as in conventional systems.

Various modes of carrying out the invention are contemplated as being within the scope of the following claims particularly pointing out and distinctly claiming the subject matter which is regarded as the invention.

I claim:

1. A liquid transfer apparatus, comprising a liquid-receiving container having an inlet to receive liquid and an outlet to discharge liquid, pumping means connected to said outlet, first control means including first liquid level sensing means for actuating said pumping means when the liquid reaches a given upper level in said container to thereby discharge liquid from said container, second control means including second liquid level sensing means to stop said pumping means when the liquid reaches a given lower level in said container, third control means including said first liquid level sensing means and also including time delay means operably connected in parallel with said first control means for delaying the operation of said pumping means for a predetermined period of time after the liquid reaches said given upper level to thereby permit said liquid to rise to a third higher level in said container and means for alternatively rendering either said first or third control means operative.

2. The apparatus of claim 1, including conduit means connecting the upper end of said container to a source of vacuum, said third higher level being located approximately at the position of connection of said conduit means and the upper end of the container.

3. The apparatus of claim 1, including conduit means connected to a source of vacuum and having a generally vertical section connected to the upper end of said container and having an inclined section connected to the upper end of said vertical section and extending downwardly therefrom, said third higher level being located approximately at the position of connection of said inclined section and said vertical section.

4. The apparatus of claim 3, wherein said conduit means includes a trap connected to the lower end of said inclined section.

5. A liquid transfer apparatus, comprising a liquid-receiving container having an inlet to receive liquid and an outlet to discharge liquid, pumping means connected to said outlet, first probe means disposed in said container, second probe means disposed in the container adjacent the bottom of said container and spaced below said first probe means, said first probe means and said second probe means being connected in a first electrical circuit with said pumping means and arranged so that said first probe means acts to close said first circuit when the liquid rises to the level of said first probe means to operate said pumping means, and said second probe means acts to open said first circuit when the liquid level falls beneath the level of said second probe means to stop the operation of said pumping means, and time delay means including switch means connected in a second electrical circuit with said first probe means and said pumping means and arranged to close a preset time after energization of said time delay means, said first probe means acting to energize said time delay means when the liquid rises to the level of said first probe means to thereby energize said time delay means, and means for selectively connecting said first and second circuits to a source of power.

6. The apparatus of claim 5, and including a second outlet in the upper end of the container and connected to a source of sub-atmospheric pressure, said second outlet being at a higher level than the level of said first probe means, said preset time being correlated with respect to the volume of the portion of the container between the level of the first probe means and said second outlet so that said liquid will rise to said second outlet before said pumping means is operated.

7. The apparatus of claim 6, wherein said first probe means is located approximately at the level of said inlet and said second probe means is located approximately at the level of said first named outlet.

References Cited

UNITED STATES PATENTS

| 3,211,171 | 10/1965 | Kinsey | 137—205 X |
| 3,297,379 | 10/1966 | Klyce | 137—392 |

FOREIGN PATENTS

| 556,599 | 10/1943 | Great Britain. |

ALAN COHAN, Primary Examiner

U.S. Cl. X.R.

119—14.08, 14.43, 392, 394

UNITED STATES PATENT OFFICE
CERTIFICATE OF CORRECTION

Patent No. 3,469,596 September 30, 1969

Donald L. Branton

It is certified that error appears in the above identified patent and that said Letters Patent are hereby corrected as shown below:

Column 6, line 31, "3,297,379" should read -- 3,279,379 --.

Signed and sealed this 8th day of December 1970.

(SEAL)
Attest:

Edward M. Fletcher, Jr.
Attesting Officer

WILLIAM E. SCHUYLER, JR.
Commissioner of Patents